United States Patent [19]

Reier

[11] Patent Number: 4,481,022

[45] Date of Patent: Nov. 6, 1984

[54] FILTER BAG ASSEMBLY

[76] Inventor: Gerald J. Reier, P.O. Box 79141, Fort Worth, Tex. 76179

[21] Appl. No.: 559,941

[22] Filed: Dec. 9, 1983

[51] Int. Cl.³ .............................................. B01D 46/02
[52] U.S. Cl. .................................... 55/341 R; 55/378; 55/507
[58] Field of Search ................ 16/281, 285, 286, 308, 16/373; 55/293, 304, 305, 378, 379, 381, 507, 341 R; 248/610-613, 619, 621

[56] References Cited

U.S. PATENT DOCUMENTS

| 569,474 | 10/1896 | Rodes | 16/373 |
|---|---|---|---|
| 724,039 | 3/1903 | Peterkin | 16/285 |
| 1,470,493 | 10/1923 | Show | 248/610 X |
| 1,815,242 | 7/1931 | Davidson | 55/381 |
| 2,010,898 | 8/1935 | Ruemelin | 55/379 |
| 2,137,254 | 11/1938 | Turnbull | 55/378 X |
| 2,338,504 | 1/1944 | Foster | 55/378 X |
| 2,879,863 | 3/1959 | Snyder | 55/304 |
| 2,933,311 | 4/1960 | Szpak | 248/613 X |
| 3,256,679 | 6/1966 | Snyder | 55/293 |
| 3,354,620 | 11/1967 | Scholl et al. | 55/378 X |
| 3,410,061 | 11/1968 | Knight | 55/381 X |
| 3,550,358 | 12/1970 | McCabe | 55/305 |
| 3,699,750 | 10/1972 | Nepereny et al. | 55/305 X |
| 3,724,178 | 4/1973 | LeBoeuf | 55/378 X |
| 3,881,673 | 5/1975 | Peterson | 55/378 X |
| 3,955,947 | 5/1976 | Hoon et al. | 55/304 X |
| 4,113,455 | 9/1978 | Richmond | 55/378 |
| 4,123,027 | 10/1978 | Huntington | 55/378 X |
| 4,396,408 | 8/1983 | Mace | 55/378 |
| 4,400,186 | 8/1983 | Leunig et al. | 55/379 |

Primary Examiner—Robert Spitzer
Attorney, Agent, or Firm—Charles D. Gunter, Jr.

[57] ABSTRACT

An improved filter bag assembly is shown for use in a filter bag house having a plurality of filter bags, each of the filter bags being anchored at a lower end and being suspended within the bag house in tensioned relation by an upper end thereof. A bag spring is attached at one side to the bag upper end and has an opposite spring side. The bag spring is tensionable between tensed and relaxed positions. A flexible strap is provided having a spring engaging end attached to the bag spring opposite spring side and has a free end. A hanger is suspended within the filter house and the flexible strap free end is engageable with the hanger when the spring is tensed whereby relaxing the spring serves to tense the filter bag.

Preferably the bag spring is a butterfly-shaped member having a central, helical coil and a pair of angularly arranged spring sides extending outwardly from the coil.

10 Claims, 4 Drawing Figures

FILTER BAG ASSEMBLY

BACKGROUND OF THE INVENTION

The present invention relates generally to a filter bag assembly of the type used in a filter housing designed to remove dust, dirt and other particulate matter from air or other gaseous medium and, specifically, to an improved tensioning mechanism and method for maintaining the filter bags in tension within the filter housing.

Fabric filtration is one technique which has proved to be efficient in separating undesirable particulate matter from a gas stream in industrial environments. Such filtration is typically performed in a dust collection apparatus known in the art as a "bag house." The bag house can be described simply as a sheet metal housing divided into two chambers by a tube sheet. Cylindrical fabric filters are disposed within openings in the tube sheet. Particulate containing gas is blown into one chamber where dust accumulates on the fabric filter as the gas passes through the fabric into the other chamber and out an exhaust. The typical bag house arrangement has a plurality of cylindrical filter bags with closed upper ends which are vertically suspended in the clean air chamber from a bag support framework. The lower ends of the bags are fixed to openings in the tube sheet. Filtration of the gas occurs from inside to the outside of the bags.

When it becomes necessary to clean the filter cake from the fabric bags, the flow of process gas is temporarily interrupted so that reverse air can be forced from the clean air chamber to the dirty air chamber. The reverse flow of cleaning air causes the dust cake on the filter bags to be dislodged and fall through the interior of the bags to the dirty air chamber for removal. In some bag house installations, reverse air cleaning is enhanced by mechanically shaking the fabric filters.

Proper tensioning of the bags plays an important role in limiting fabric collapse during the cleaning process. If the bags are stretched too tightly between the supporting framework and the tube sheet, the bags do not collapse during cleaning but suffer accelerated wear. If the bags are installed too loosely, then the fabric collapses during cleaning and will not permit the dust cake to fall through the bag to the bottom of the dirt chamber.

The installation and maintenance of filter bags of the type used in bag houses has tradionally been a time consuming and costly operation. Prior bag designs have, in general, been difficult to service for purposes of rejuvenation, replacement and installation. A need exists for an improved filter bag assembly and mounting technique which would alleviate the various installation and maintenance problems which have been encountered in the past.

SUMMARY OF THE INVENTION

An improved filter bag assembly is shown for use in a filter housing having a plurality of filter bags, each of the filter bags being anchored at a lower end and being suspended within the housing in tensioned relation by an upper end thereof. A bag spring is attached at one side to the bag upper end and has an opposite spring side. The bag spring is tensionable between tensed and relaxed positions. A flexible bag strap has a spring engaging end attached to the bag spring opposite spring side and has a free end. Hanger means suspended within the filter housing are provided for engaging the flexible strap free end when the bag spring is tensed, whereby relaxing the spring serves to place the filter bag in tension.

The bag spring is preferably a butterfly-shaped member having a central, helical coil and a pair of angularly arranged spring sides extending outwardly from the coil. The hanger means is preferably a curved bolt which is mounted at one end within the housing and which has an opposite looped portion for receiving the flexible strap.

In the method of installing a filter bag within the filter housing, the bag lower end is first anchored within the filter housing. The bag spring is then tensed and while maintaining the spring in tension, the end of the flexible strap opposite the spring is attached to the curved bolt which is suspended within the filter housing. The filter bag is then placed in tension by allowing the butterfly-shaped spring to relax. The filter bag can be removed from within the filter housing by cutting the flexible strap and allowing the bag to collapse. The bag is then removed by removing the bag lower anchor and removing the remaining strap from the bolt loop portion.

Additional objects, features and advantages will be apparent in the written description which follows.

DETAILED DESCRIPTION OF THE INVENTION

Figure 1:
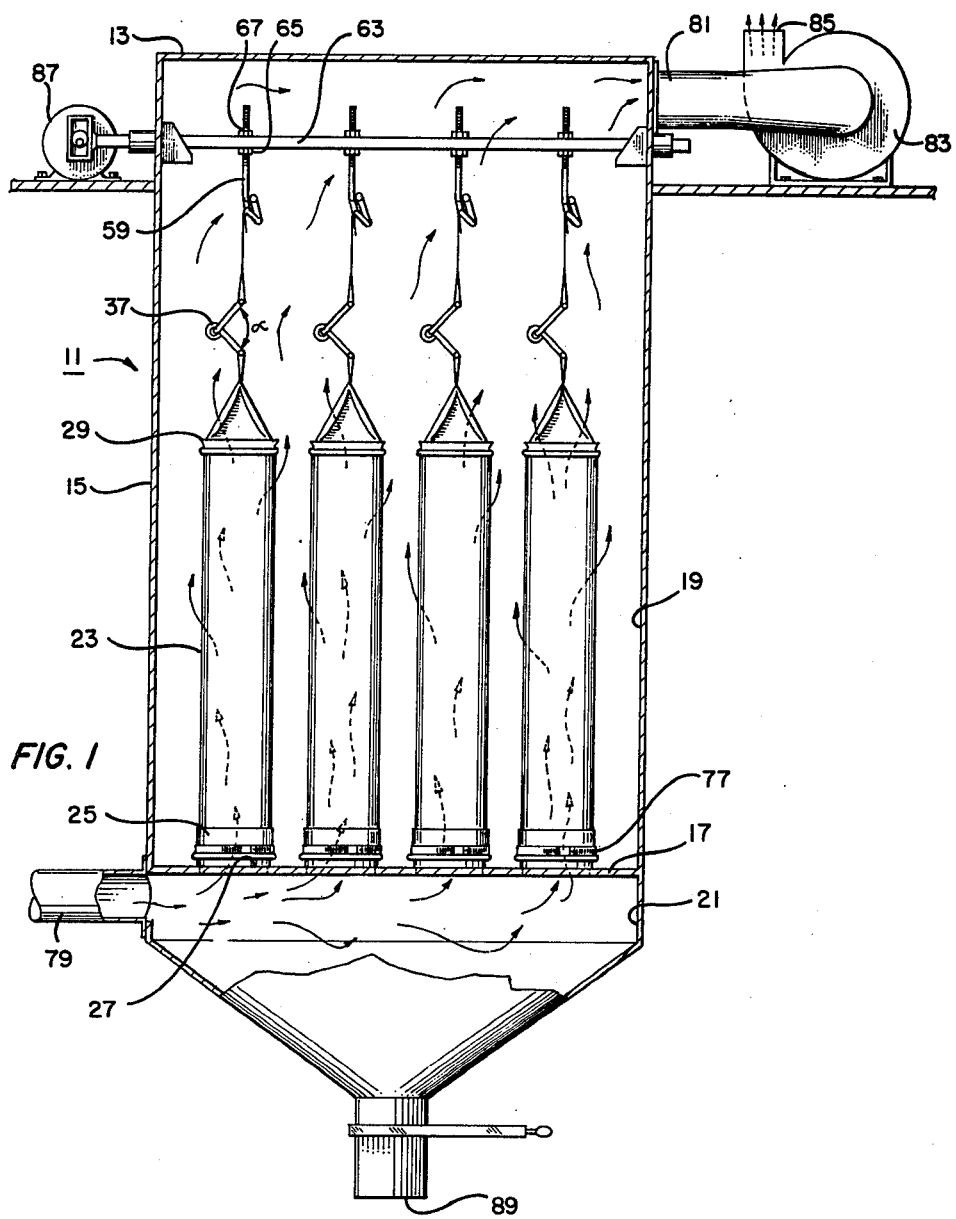
FIG. 1 is a side partial cross-sectional view of a filter housing showing the installation of a filter bag assembly of the invention.

FIG. 1 shows a filter bag assembly designated generally as 11 in place within a filter housing 13. The filter housing 13, sometimes referred to as a "bag house", includes a metal frame 15 which is divided by a tube sheet 17 into an upper chamber 19 and a lower chamber 21. A plurality of filter bags 23 are suspended within the filter housing 13, each of the bags 23 being anchored at a lower end 25 about an opening 27 in the tube sheet and being suspended within the housing 13 in tensioned relation by an upper end 29.

Figure 2:
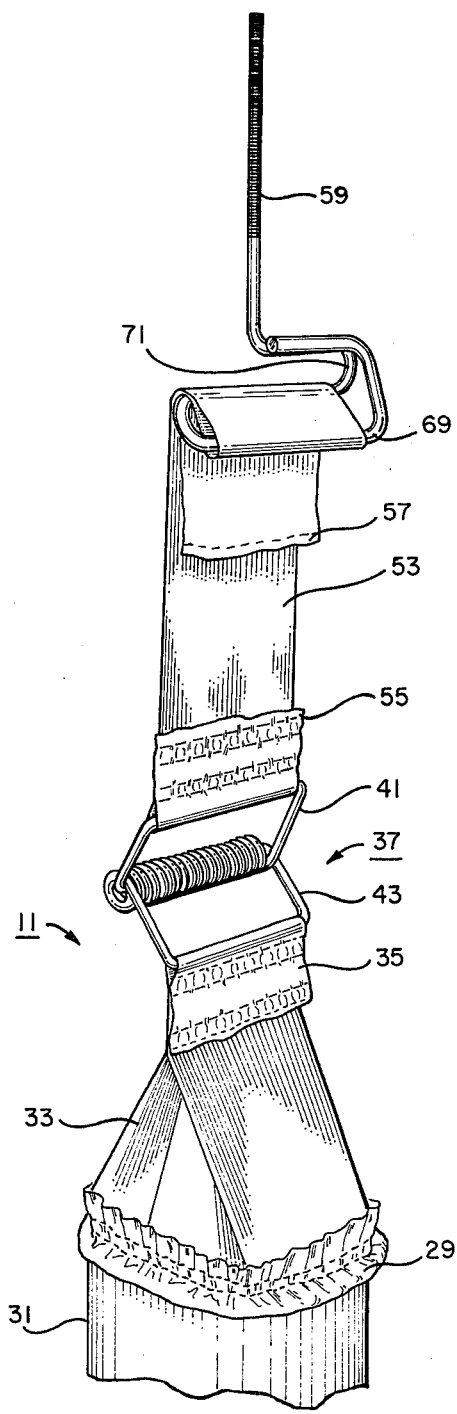
FIG. 2 is a close-up, perspective view of the upper end of a filter bag showing the tensioning spring of the invention.

The filter bag assembly 11 is shown in greater detail in FIG. 2. The filter bag assembly 11 includes a fabric bag 31 having a generally cylindrical body, the lower end 25 of which includes a metal band or clamp for attachment to the tube sheet (see FIG. 1). The bag upper end 29 includes a rigid ring, preferably made of stainless steel or carbon steel, which is sewn into the bag top. The bag end 33 which extends upwardly from the reinforced upper end 29 is pleated into a tent-like shape and has a fabric strap 35 attached thereto. Other bag end constructions can be envisioned as well, such as the use of a hard disk which would be sewn into the bag top instead of using the ring and pleated end construction. In such case, the fabric strap 35 would connect directly to the bag top.

Figure 4:
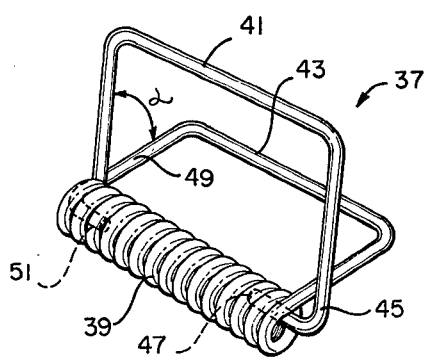
FIG. 4 is an isolated, perspective view of the butterfly-shaped, tensioning spring of the invention.

A butterfly-shaped bag spring 37 is attached at one side to the fabric strap 35, at shown in FIG. 2. As shown in FIG. 4, the bag spring 37 includes a central, helical coil 39 and a pair of angularly arranged spring sides 41, 43 extending outwardly from the coil 39. The spring 37 is formed from a continuous length of wire, the length of wire being formed as a helical coil having an end portion 45 bent into two right angles and terminating in a first spring end 47 (shown in dotted lines in FIG. 4) which extends within the coil diameter. The coil 39 also has an opposite end portion 49 which is bent into two right angles and which terminates in an opposite spring end 51 (shown in dotted lines in FIG. 4) which extends within the coil diameter in the opposite direction from the first spring end 47.

The spring sides 41, 43, as shown in FIG. 4, form an angle indicated as alpha in FIG. 4 with respect to the central coil 39. The spring 37 can be tensed by varying the angle alpha formed between the spring sides 41, 43. The spring 37 can be "cocked" by increasing the angle alpha as viewed in FIG. 4. The spring 37 tends to relax once the cocking force is removed by decreasing the angle alpha as viewed in FIG. 4.

As shown in FIG. 2, the fabric strap 35 of the bag end 33 is secured to the spring side 43 by sewing the side 43 within a fold of the strap 35. The filter bag assembly 11 also has a flexible bag strap 53 which has a spring engaging end 55 which is attached to the bag spring opposite spring side 41 as by sewing the spring side 41 within a flap of the flexible strap 53. The flexible bag strap 53 also has a free end 57.

Figure 3:
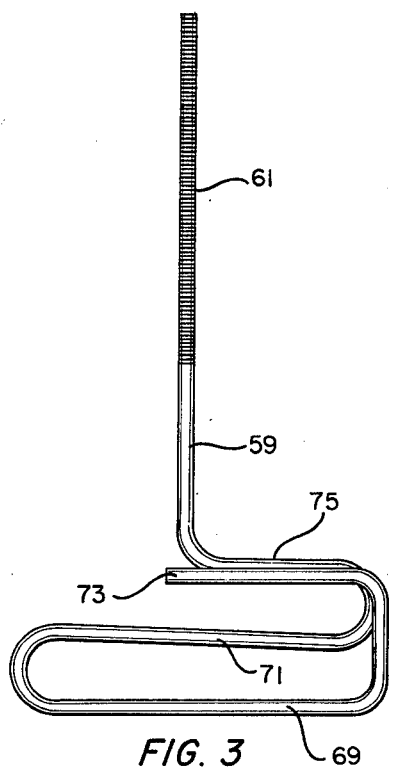
FIG. 3 is an isolated, perspective view of the curved bag suspending bolt of the invention.

The bag assembly 11 is adapted to be supported from a hanger means such as the curved bolt 59 shown in FIGS. 2 and 3. The curved bolt 59 includes a vertically extending threaded end 61 which is received within a hanger 63 (FIG. 1) where it is retained, as by bolts 65, 67. As shown in FIG. 3, the bolt 59 includes a loop portion having parallel sides 69, 71 and an end region 73, parallel to but spaced-apart from a curved region 75. As shown in FIG. 2, the bag 23 is suspended from the curved bolt 59 by passing the flexible strap free end 57 over sides 69, 71 and underneath itself and over side 71.

The operation of the invention will now be described. Applicant's filter bag assembly 11 is supplied as a unit including the bag 23, flexible strap 53 and spring 37 sewn therebetween. The bag lower end 25, as shown in FIG. 1, is anchored to the tube plate 17 as by a clamp 77. The bag bolt 59 is in place on the hanger 63. The bag spring 37 would then be tensed or "cocked", as with pliers or a special tool, by increasing the angle alpha as shown in FIGS. 1 and 4. The flexible strap free end 53 would then be wound securely about the bolt loop portion 69, 71 while maintaining the spring 37 in the "cocked" position. Once the flexible strap 53 is secured to the bag bolt 59, the bag spring 37 would be released, thereby providing tension in the bag cylindrical sides.

Dirty gas would then typically enter the housing 13 through an inlet 79 and would pass through the openings 27 in the tube sheet 17 and pass up the bag interiors and out the sides thereof into the upper chamber 19 as shown by the arrows in FIG. 1. The clean gas from which the particulate matter has been removed would then be pulled through an outlet 81 as by a fan 83 and would be recirculated through a duct 85.

Periodically, a cleaning cycle is performed by cutting off the gas passing into the inlet 79, reversing the gas flow through the housing 13, and activating a shaker motor 87 which would reciprocate the hanger 83. The dust or other particulate matter which has accumulated within the bag 23 would then fall down into the lower chamber 21 and pass out an exhaust conduit 89.

An invention has been provided with significant advantages. The filter bag of the invention is provided as a unit with a spring sewn into the assembly. The bag top of the invention costs less to manufacture than previous bag designs and is permanently attached. The pleated bag end is also permanently attached and is less expensive than hanger rods, and the like, used in prior designs. The bag spring being sewn into the filter bag assembly at the factory, is more economical for bag replacement than prior designs. The bag is conveniently removed by simply cutting the old flexible strap allowing the assembly to fall to the tube plate. The bag lower end would then be unfastened and the old bag and remaining strap portion would be removed. The new bag would be installed as has been described.

Applicant's invention eliminates the expensive and time consuming operations required in the past to remove bag caps from old bags, clean old bag caps, and install the cleaned caps into a new bag. Applicant's invention also greatly simplifies the procedure of mechanically tensioning the bag and cap assembly. Applicant's tension spring is on the outside of the bag in the clean air portion of the filter housing. Applicant's spring is virtually self cleaning with its normal motion during use in the filter housing. During installation and replacement of applicant's assembly, all components are in plain view, whereas in presently used systems, portions of the work to be done are required to be accomplished in confined spaces, sometimes out of sight. Bag life is extended with applicant's device due to elimination of bag sagging or collapsing of the bag lower end which insures full reverse air flow and proper removal of particulate from the bag interior.

While the invention has been shown in only one of its forms, it is not thus limited but is susceptible to various changes and modifications without departing from the spirit thereof.

I claim:

1. An improved filter bag assembly for a filter housing having a plurality of filter bags, each of said filter bags being anchored at a lower end and being suspended within said housing in tensioned relation by an upper end thereof, comprising:
    a bag spring attached at one side to said bag upper end and having an opposite spring side, said bag spring being tensionable between tensed and relaxed positions;
    a flexible strap having a spring engaging end attached to said bag spring opposite spring side and having a free end; and
    hanger means suspended within said filter housing, said flexible strap free end being engageable with said hanger means when said bag spring is tensed whereby relaxing said spring serves to tense said filter bag.

2. The filter bag assembly of claim 1, wherein said bag spring is a butterfly-shaped member having a central, helical coil and a pair of angularly arranged spring sides extending outwardly from said coil.

3. The filter bag assembly of claim 1, wherein said hanger means is a curved bolt which is mounted at one end within said housing and which has an opposite looped portion for receiving said flexible strap.

4. An improved filter bag assembly for a filter housing having a plurality of filter bags, each of said filter bags being anchored at a lower end and being suspended within said housing in tensioned relation by an upper end thereof, comprising:

a reinforcing member within each of said filter bag upper ends;

a bag end extending upwardly from said reinforced upper end;

a butterfly-shaped bag spring attached at one side to said bag upper end and having an opposite spring side, said bag spring being tensionable between tensed and relaxed positions;

a flexible strap having a spring engaging end attached to said bag spring opposite spring side and having a free end; and a curved bolt mounted at one end within said filter housing and having an opposite loop portion, said flexible strap free end being engagable with said loop portion when said bag spring is tensed whereby relaxing said spring serves to tense said filter bag.

5. The filter bag assembly of claim 4, wherein said spring has a central, helical coil and a pair of angularly arranged spring sides extending outwardly from said coil, said bag spring being tensionable by varying the angle formed between said spring sides.

6. The filter bag assembly of claim 5, wherein said butterfly-shaped spring is formed from a continuous length of wire, said length of wire being formed as a helical coil having an end portion bent into two right angles and terminating in a first spring end which extends within said coil diameter, and said coil having an opposite end portion bent into two right angles and terminating in an opposite spring end which extends within the coil diameter in the opposite direction from said first spring end.

7. The filter bag assembly of claim 6, wherein one of said spring sides is sewn to said bag end and said opposite spring side is sewn to said flexible strap spring engaging end.

8. A method of installing a filter bag within a filter housing to maintain the bag in tensioned relationship, the bag having an upper end attached to one side of a butterfly-shaped spring and having one end of a flexible strap attached to the opposite spring side, comprising the steps of:

anchoring the bag lower end within the filter housing;

tensioning said spring;

attaching the end of said flexible strap opposite said spring to a hanger suspended within said filter housing; and placing said filter bag in tension by relaxing said spring.

9. The method of claim 8, wherein said bag is suspended from said hanger by passing said flexible strap around a loop portion of said hanger.

10. The method of claim 8 further comprising the steps of:

removing said filter bag from within said filter housing by cutting said flexible strap and allowing said bag to collapse, removing said bag lower anchor and removing said remaining strap from said hanger loop portion.

* * * * *